United States Patent
Stepan et al.

(10) Patent No.: US 12,103,415 B2
(45) Date of Patent: Oct. 1, 2024

(54) APPARATUS FOR INCREASING AN INPUT VOLTAGE FOR AN ELECTRIC VEHICLE, ELECTRIC VEHICLE AND METHOD FOR OPERATING AN APPARATUS

(71) Applicant: ZF FRIEDRICHSHAFEN AG, Friedrichshafen (DE)

(72) Inventors: Zbynek Stepan, Plzen (CZ); Frank Seemann, Euerbach (DE); Andre Ehrsam, Bergrheinfeld (DE); Martin Mach, Plzen (CZ); Vladimir Dvorak, Plzen (CZ); Gabriel Scherer, Deggenhausertal (DE); Tato Gervais Amani, Nuremberg (DE); Matthias Engicht, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 269 days.

(21) Appl. No.: 17/723,834

(22) Filed: Apr. 19, 2022

(65) Prior Publication Data

US 2022/0340028 A1    Oct. 27, 2022

(30) Foreign Application Priority Data

Apr. 21, 2021 (DE) ...................... 10 2021 203 969.3

(51) Int. Cl.
*B60L 53/22* (2019.01)
*B60L 53/62* (2019.01)
(Continued)

(52) U.S. Cl.
CPC ............... *B60L 53/22* (2019.02); *B60L 53/62* (2019.02); *H02M 3/33573* (2021.05);
(Continued)

(58) Field of Classification Search
CPC ...... B60L 2210/12; B60L 50/75; B60L 55/00; B60L 2210/14; B60L 1/00; B60L 53/22;
(Continued)

(56) References Cited

U.S. PATENT DOCUMENTS 7,663,343 B2 * 2/2010 Soma ..................... B60W 20/13
                                                    320/135
9,065,338 B2 * 6/2015 Ueno .................. H02M 3/1584
(Continued)

FOREIGN PATENT DOCUMENTS

DE      102006000314      1/2007
DE      112012007254     10/2015
(Continued)

OTHER PUBLICATIONS

Office Action for corresponding German Patent Application No. 10 2021 203 969.3.

*Primary Examiner* — Elim Ortiz
(74) *Attorney, Agent, or Firm* — Cozen O'Connor

(57) ABSTRACT

An apparatus for increasing an input voltage for an electric vehicle has an energy supply interface to a vehicle battery, a DC-DC converter and an inverter. The DC-DC converter has a first connection for connection to the energy supply interface and a second connection for connection to the inverter. The DC-DC converter is designed to supply an output voltage at the second connection in response to an amplifier signal, the output voltage being increased with respect to an input voltage applied to the first connection. The inverter has an inverter connection for connecting the inverter to the second connection and has at least one energization interface for energizing at least one unit coupled to the energization interface, the inverter converts a DC voltage applied to the inverter connection to an AC voltage and to supply same to the energization interface.

12 Claims, 3 Drawing Sheets

(51) Int. Cl.
*H02M 3/335* (2006.01)
*H02M 7/5387* (2007.01)

(52) U.S. Cl.
CPC ..... *H02M 3/33576* (2013.01); *H02M 7/5387* (2013.01); *B60L 2210/10* (2013.01); *B60L 2210/42* (2013.01)

(58) Field of Classification Search
CPC .. B60L 53/62; B60L 2210/10; B60L 2210/42; H02M 1/007; H02M 3/33573; H02M 3/33576; H02M 7/5387; Y02T 10/70
See application file for complete search history.

(56) References Cited

U.S. PATENT DOCUMENTS

| | | | |
|---|---|---|---|
| 11,014,451 B2* | 5/2021 | Zou | B60L 1/006 |
| 11,173,803 B2* | 11/2021 | Bhat | B60L 53/22 |
| 2004/0130292 A1* | 7/2004 | Buchanan | B60L 53/20 |
| | | | 320/116 |
| 2010/0117594 A1* | 5/2010 | Bissontz | B60W 10/08 |
| | | | 320/157 |
| 2019/0103766 A1* | 4/2019 | Von Novak, III | H02M 3/137 |
| 2020/0062125 A1* | 2/2020 | Brauner | H02J 7/0063 |
| 2022/0340028 A1* | 10/2022 | Stepan | H02M 1/007 |

FOREIGN PATENT DOCUMENTS

| | | |
|---|---|---|
| DE | 102018103081 | 8/2018 |
| DE | 102019122261 | 2/2020 |
| DE | 102019128252 | 4/2020 |
| DE | 102019128406 | 4/2020 |

* cited by examiner

APPARATUS FOR INCREASING AN INPUT VOLTAGE FOR AN ELECTRIC VEHICLE, ELECTRIC VEHICLE AND METHOD FOR OPERATING AN APPARATUS

BACKGROUND OF INVENTION

1. Field of the Invention

The present disclosure relates to an apparatus for increasing an input voltage for an electric vehicle, to an electric vehicle, and to a method for operating an apparatus.

2. Description of Related Art

In the industry, electrified driving as part of being environmentally friendly is becoming increasingly more important, with the aim of electrically driving not only passenger vehicles but also commercial vehicles.

SUMMARY OF THE INVENTION

Against this background, the present approach provides an improved apparatus for increasing an input voltage for an electric vehicle, furthermore an improved electric vehicle, and a method for operating an improved apparatus The advantages that can be achieved using the presented approach consist in being able to increase a DC voltage supplied by a vehicle battery in order to be able to reliably supply a required electrical energy for the operation of a unit inside the vehicle or outside the vehicle.

An apparatus for increasing an input voltage for an electric vehicle has an energy supply interface, a DC-DC converter and an inverter. The energy supply interface is formed for connecting the apparatus to a vehicle battery of the electric vehicle or to a vehicle fuel cell of the electric vehicle. The DC-DC converter has a first connection for connecting the DC-DC converter to the energy supply interface and a second connection for connecting the DC-DC converter to the inverter, wherein the DC-DC converter is designed to supply an output voltage at the second connection in response to an amplifier signal, the output voltage being increased with respect to an input voltage applied to the first connection. The inverter has an inverter connection for connecting the inverter to the second connection and has an energization interface for energizing at least one unit coupled to the energization interface, wherein the inverter is designed to convert a DC voltage applied to the inverter connection to an AC voltage and to supply same to the energization interface.

The electric vehicle can be realized as an electrified commercial vehicle, for example as a lorry. The energization interface can be designed to electrically connect one or more vehicle-internal or vehicle-external units. The inverter can be designed to convert the DC voltage applied to the inverter connection to the AC voltage and to supply same to the energization interface in response to an inverter signal. As an alternative, however, the inverter can also be designed to convert the applied DC voltage to the AC voltage and to supply same to the energization interface automatically when the DC voltage is applied to the inverter connection. Thanks to the apparatus presented here, it is possible to ensure that a voltage supplied by a vehicle battery and/or vehicle fuel cell can be increased where necessary before it is used to supply power to a unit. This may be helpful since the voltage and energy that can be supplied by the vehicle battery or vehicle fuel cell can decrease as the age thereof increases.

The DC-DC converter can be designed to supply an output voltage at the second connection, the output voltage corresponding to the input voltage when the amplifier signal is not present. According to requirements, either an unchanged output voltage or an increased output voltage can thus be supplied. For example, the amplifier signal is generated only when the output voltage, which is increased with respect to the input voltage, is required.

The inverter can be designed to supply an AC voltage of essentially 400 to 600 volts or 230 volts and/or in a frequency range of essentially 50 Hz to 60 Hz at the energization interface. The energization interface can thus be designed to connect one or more vehicle-internal or vehicle-external units. For example, to this end the energization interface can be coupled or able to be coupled to a unit connection for the unit, which can be operated within a tolerance range of 15% deviation at 230 volts, for example within a tolerance range of 10% deviation in a frequency range of 50 hertz to 60 hertz, or within a tolerance range of 15% deviation 400 volts to 600 volts AC, for example within a tolerance range of 10% deviation in a frequency range of 50 hertz to 60 hertz. The unit connection can be formed as a plug. However, it is also possible for more, for example three such unit connections for three units, to be coupled or able to be coupled, of which at least one can be operated within a tolerance range of 15% deviation at 230 volts AC, for example within a tolerance range of 10% deviation in a frequency range of 50 hertz to 60 hertz, and/or at least one can be operated within a tolerance range of 15% deviation at 400 volts to 600 volts AC, for example within a tolerance range of 10% deviation in a frequency range of 50 hertz to 60 hertz. For example, a further electric vehicle, for example a further vehicle battery of the further electric vehicle for charging the further vehicle battery via the vehicle battery and/or vehicle fuel cell, can be connected to the energization interface.

According to one aspect of the invention, the DC-DC converter can also have a third connection for connecting the DC-DC converter to a further inverter, wherein the DC-DC converter is designed to furthermore supply the output voltage at the third connection in response to the amplifier signal, the output voltage being increased with respect to the input voltage applied to the first connection. As an alternative, the DC-DC converter can be designed to supply the output voltage at the third connection in response to a further amplifier signal, the output voltage being increased with respect to the input voltage applied to the first connection. The further inverter can be used for example to supply an operating energy for an additional drive of the electric vehicle using the output voltage. The additional drive can be designed for example to provide a functionality that goes beyond the progressive movement of the electric vehicle. For example, the additional drive can be used to drive an excavator shovel or a crane of the electric vehicle. It is thus advantageously possible for the increased output voltage to be available for the additional drive in order to ensure correct operation thereof.

It is also advantageous when the apparatus according to an aspect of the invention has the further inverter, which has a fourth connection for connecting the further inverter to the third connection and a fifth connection for connecting the further inverter to an additional drive, wherein the further inverter is designed to convert a DC voltage applied to the fourth connection to an AC voltage and to supply same at the fifth connection. It is thus possible to supply an AC voltage for the additional drive. The further inverter can be designed to convert the DC voltage applied to the fourth connection to the AC voltage and to supply same to the fifth connection in response to a further inverter signal. As an alternative, however, the further inverter can also be designed to convert the applied DC voltage to the AC voltage and to supply same at the fifth connection automatically when the DC voltage is applied to the fourth connection.

The further inverter can be designed to supply an AC voltage of essentially 400 to 600 volts and/or in a frequency range of essentially 50 Hz to 60 Hz at the fifth connection. The supplied AC voltage of the further inverter can thus also be within a tolerance range of 15% deviation 400 to 600 volts and/or within a tolerance range of 10% deviation in a frequency range of 50 Hz to 60 Hz. Such a voltage is suitable for the operation of the additional drive.

The apparatus can also furthermore have the additional drive having an additional drive connection for connection to the fifth connection.

It is furthermore advantageous when the apparatus according to an aspect of the invention has a control device, which is designed to output the amplifier signal in order to supply the output voltage at the second connection, the output voltage being increased with respect to the input voltage applied to the first connection. The control device can also be designed to furthermore output the further amplifier signal in order to supply the output voltage at the third connection, the output voltage being increased with respect to the input voltage applied to the first connection. It is thus possible to control an increase in the input voltage according to requirements.

The control device can be designed to output the amplifier signal when the input voltage has or falls below a defined minimum voltage limit value. The minimum voltage limit value may be 500 volts, for example. It is thus possible to ensure that a lower voltage value is increased.

The control device can also be designed not to output the amplifier signal when the input voltage exceeds a defined minimum voltage limit value. The minimum voltage limit value may be 500 volts, for example. It is thus possible to ensure that a higher voltage value is not increased.

According to an aspect of the invention, the DC-DC converter can be designed to supply the output voltage at the second connection in response to the amplifier signal, the output voltage having at least 576 volts. Accordingly, the DC-DC converter can be designed to supply the output voltage at the third connection in response to the amplifier signal or further amplifier signal, the output voltage having at least 576 volts. It is thus possible to supply a voltage required to operate an additional drive or to maintain an electricity grid or charge a further vehicle battery or further vehicle fuel cell.

The apparatus can also comprise the vehicle battery and/or vehicle fuel cell, which is designed to supply a DC voltage between 500 and 650 volts. It is thus possible to use a common vehicle battery, wherein, thanks to the apparatus, an output voltage with a predetermined value is nevertheless available in the case of a low supplied voltage of only 500 volts for example due to age but also in the case of a high supplied voltage of 650 volts.

An electric vehicle comprises an apparatus which is formed in one of the variants described above. The electric vehicle can be realized as an electrified commercial vehicle, for example as a lorry. The electric vehicle can also comprise the additional drive which is electrically connected to the fifth connection.

A method for operating an apparatus which is formed in one of the variants described above has an increasing step and a conversion step. In the increasing step, an input voltage applied to the first connection is increased in response to the amplifier signal and an output voltage, which is increased with respect to the input voltage, is supplied at the second connection. In the conversion step, a DC voltage applied to the inverter connection is converted to an AC voltage and the AC voltage is supplied at the energization interface.

This method can be implemented for example in software or hardware or in a mixed form of software and hardware, for example in a controller.

BRIEF DESCRIPTION OF THE DRAWINGS

Exemplary embodiments of the approach presented here are illustrated in the drawings and explained in more detail in the description which follows. In the drawings.

DETAILED DESCRIPTION OF THE PRESENTLY PREFERRED EMBODIMENTS

In the following description of preferred exemplary embodiments of the present approach, identical or similar reference signs are used for the elements with a similar effect illustrated in the various figures, wherein a repeated description of these elements is omitted.

Figure 1:
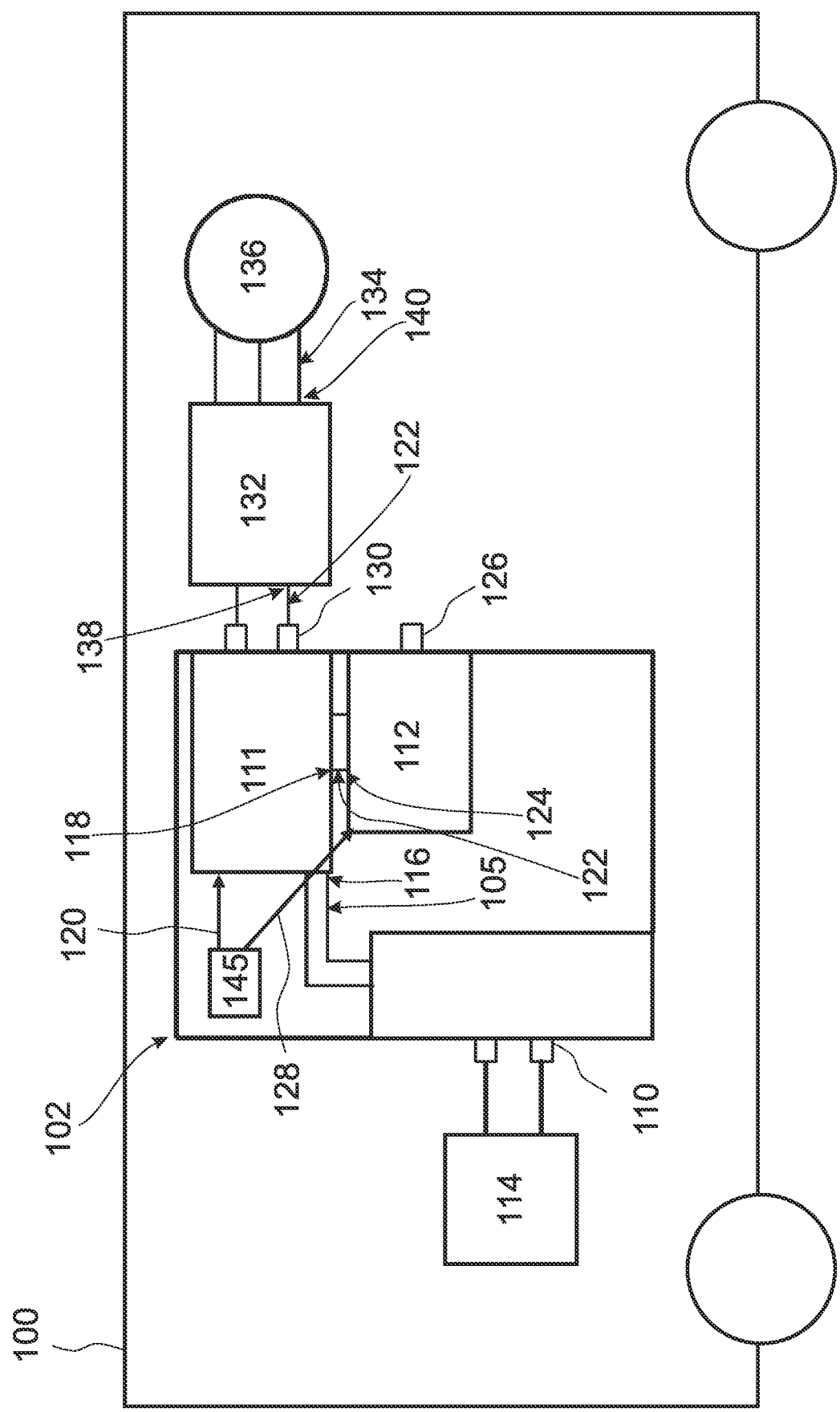
FIG. 1 is an electric vehicle having an apparatus for increasing an input voltage.

FIG. 1 shows a schematic illustration of an electric vehicle 100 having an apparatus 102 for increasing an input voltage 105 according to an exemplary aspect of the invention.

According to this exemplary aspect, the apparatus 102 is arranged in or on the electric vehicle 100, purely by way of example. The electric vehicle 100 is realized for example as an electrified lorry, for example having a gristmill or for example a concrete pump. The apparatus 102 has an energy supply interface 110, a DC-DC converter 111 and an inverter 112. The energy supply interface 110 is formed to connect the apparatus 102 to a vehicle battery 114 of the electric vehicle 100 and/or to a vehicle fuel cell of the electric vehicle 100. The DC-DC converter 111 has a first connection 116 for connecting the DC-DC converter 111 to the energy supply interface 110 and a second connection 118 for connecting the DC-DC converter 111 to the inverter 112. The DC-DC converter 111 is designed to supply an output voltage 122 at the second connection 118 in response to an amplifier signal 120, the output voltage being increased with respect to an input voltage 105 applied to the first connection 116. The inverter 112 has an inverter connection 124 for connecting the inverter 112 to the second connection 118 and has at least one energization interface 126 for energizing at least one unit coupled to the energization interface 126, wherein the inverter 112 is designed to convert a DC voltage applied to the inverter connection 124 to an AC voltage and to supply same to the energization interface 126.

The energization interface 126 is designed to electrically connect one or more vehicle-internal or vehicle-external units. According to this exemplary embodiment, the inverter 112 is designed to convert the DC voltage applied to the inverter connection 124 to the AC voltage and to supply same to the energization interface 126 in response to an inverter signal 128. According to an alternative exemplary embodiment, the inverter 112 is designed to convert the applied DC voltage to the AC voltage and to supply same to the energization interface 126 automatically when the DC voltage is applied to the inverter connection 124. According to this exemplary embodiment, the DC-DC converter 111 is furthermore designed to supply an output voltage at the second connection 118, the output voltage corresponding to the input voltage 105 when the amplifier signal 120 is not present.

According to this exemplary embodiment, the inverter 112 is designed to supply an AC voltage of 400 to 600 volts or an AC voltage of 230 volts at the energization interface 126. According to an exemplary embodiment, the AC voltage is supplied in a frequency range of 50 Hz to 60 Hz.

According to an exemplary embodiment, the DC-DC converter 111 optionally furthermore has a third connection 130 for connecting the DC-DC converter 111 to a further inverter 132, wherein the DC-DC converter 111 is designed to furthermore supply the output voltage 122 at the third connection 130 in response to the amplifier signal 120, the output voltage being increased with respect to the input voltage 105 applied to the first connection 116. According to an alternative exemplary embodiment, the DC-DC converter 111 is designed to supply the output voltage 122 at the third connection 130 in response to a further amplifier signal, the output voltage being increased with respect to the input voltage 105 applied to the first connection 116. According to an exemplary embodiment, the further inverter 132 is used to supply an operating energy 134 for an additional drive 136 of the electric vehicle 100 using the output voltage 122. According to this exemplary embodiment, the additional drive 136 is designed for example to provide a functionality that goes beyond the progressive movement of the electric vehicle 100. For example, the additional drive 136 is used to drive an excavator shovel or a crane of the electric vehicle 100.

According to an exemplary embodiment, the apparatus 102 furthermore has the further inverter 132, which has a fourth connection 138 for connecting the further inverter 132 to the third connection 130 and a fifth connection 140 for connecting the further inverter 132 to an additional drive 136, wherein the further inverter 132 is designed to convert a DC voltage applied to the fourth connection 138 to an AC voltage and to supply same at the fifth connection 140. According to this exemplary embodiment, the further inverter 132 is designed to convert the DC voltage applied to the fourth connection 138 to the AC voltage and to supply same to the fifth connection 140 in response to a further inverter signal. According to an alternative exemplary embodiment, the further inverter 132 is designed to convert the applied DC voltage to the AC voltage and to supply same to the fifth connection 140 automatically when the DC voltage is applied to the fourth connection 138.

According to an exemplary embodiment, the further inverter 132 can be designed to supply an AC voltage of essentially 400 to 600 volts and/or in a frequency range of essentially 50 Hz to 60 Hz at the fifth connection 140.

According to an exemplary embodiment, the apparatus 102 also furthermore has the additional drive 136 having an additional drive connection for connection to the fifth connection 140.

According to an exemplary embodiment, the apparatus 102 furthermore comprises a control device 145, which is designed to output the amplifier signal 120 in order to supply the output voltage 122 at the second connection 118, the output voltage being increased with respect to the input voltage 105 applied to the first connection 116. According to an alternative exemplary embodiment, the control device 145 is also designed to output the further amplifier signal in order to supply the output voltage 122 at the third connection 130, the output voltage being increased with respect to the input voltage 105 applied to the first connection 116. According to an exemplary embodiment, the control device 145 is designed to output the amplifier signal 120 when the input voltage 105 has or falls below a defined minimum voltage limit value. According to an exemplary embodiment, the minimum voltage limit value is 500 volts, for example. According to an exemplary embodiment, the control device 145 is further designed not to output the amplifier signal 120 when the input voltage 105 exceeds the defined minimum voltage limit value.

According to this exemplary embodiment, the DC-DC converter 111 is designed to supply the output voltage 122 at the second connection 118 in response to the amplifier signal 120, the output voltage having at least 576 volts. According to an exemplary embodiment, accordingly, the DC-DC converter 111 is designed to supply the output voltage 122 at the third connection 130 in response to the amplifier signal or further amplifier signal, the output voltage having at least 576 volts.

According to an exemplary embodiment, the apparatus 102 also comprises the vehicle battery 114 and/or vehicle fuel cell, which is designed to supply a DC voltage between 500 and 650 volts.

Thanks to the DC-DC converter 111, which can also be referred to as DC/DC converter, the apparatus 102 presented here advantageously enables a boost function for the energization interface 126 and/or an electrically operable additional drive 136 with a microgrid, that is to say a locally limited electricity grid. The additional drive 136 can also be referred to as "ePower to work application", or "ePTO" for short.

In this case, the DC-DC converter 111 is connected between the vehicle battery 114 and/or vehicle fuel cell and the inverter 112 and/or further inverter 132. The DC-DC converter 111 advantageously makes it possible to increase the DC voltage supplied by the vehicle battery 114 and/or vehicle fuel cell—this means a stabilization of a DC link voltage at a low supplied 2 0 voltage by the vehicle battery 114 and/or vehicle fuel cell. Furthermore, thanks to the DC-DC converter 111, the operating point is optimized and/or the efficiency for the additional drive 132, which can also be referred to as "eMotor", is improved. Furthermore, thanks to the DC-DC converter 111, a minimum voltage for the electricity grid, which can be referred to as "microgrid", is guaranteed. According to an exemplary embodiment, the minimum voltage is 576 volts DC at the second connection 118 and/or third connection 130 for providing an AC voltage of for example 400 VAC/50 Hz at the energization interface 126 and/or the additional drive connection. According to an exemplary embodiment, the apparatus 102 comprises at least one galvanic insulation.

The boost function that can be carried out by the DC-DC converter 111 guarantees a sufficient voltage level and proper function when constructing the microgrid 400 VAC/50 Hz—for example when the vehicle battery 114 and/or vehicle fuel cell at a nominal voltage of 650 volts DC supplies a minimum voltage of approximately 500 volts DC, which is not sufficient for the construction of the microgrid 400 VAC/50 Hz. A minimum DC voltage of 576 volts is necessary for constructing such a microgrid. When the voltage thus falls below this minimum DC voltage of 576 volts, according to an exemplary embodiment, the DC-DC converter 111 increases the voltage to 576 volts or above 576 volts DC and thus guarantees the proper function of the microgrid 400 VAC/50 Hz without a voltage drop.

Figure 2:
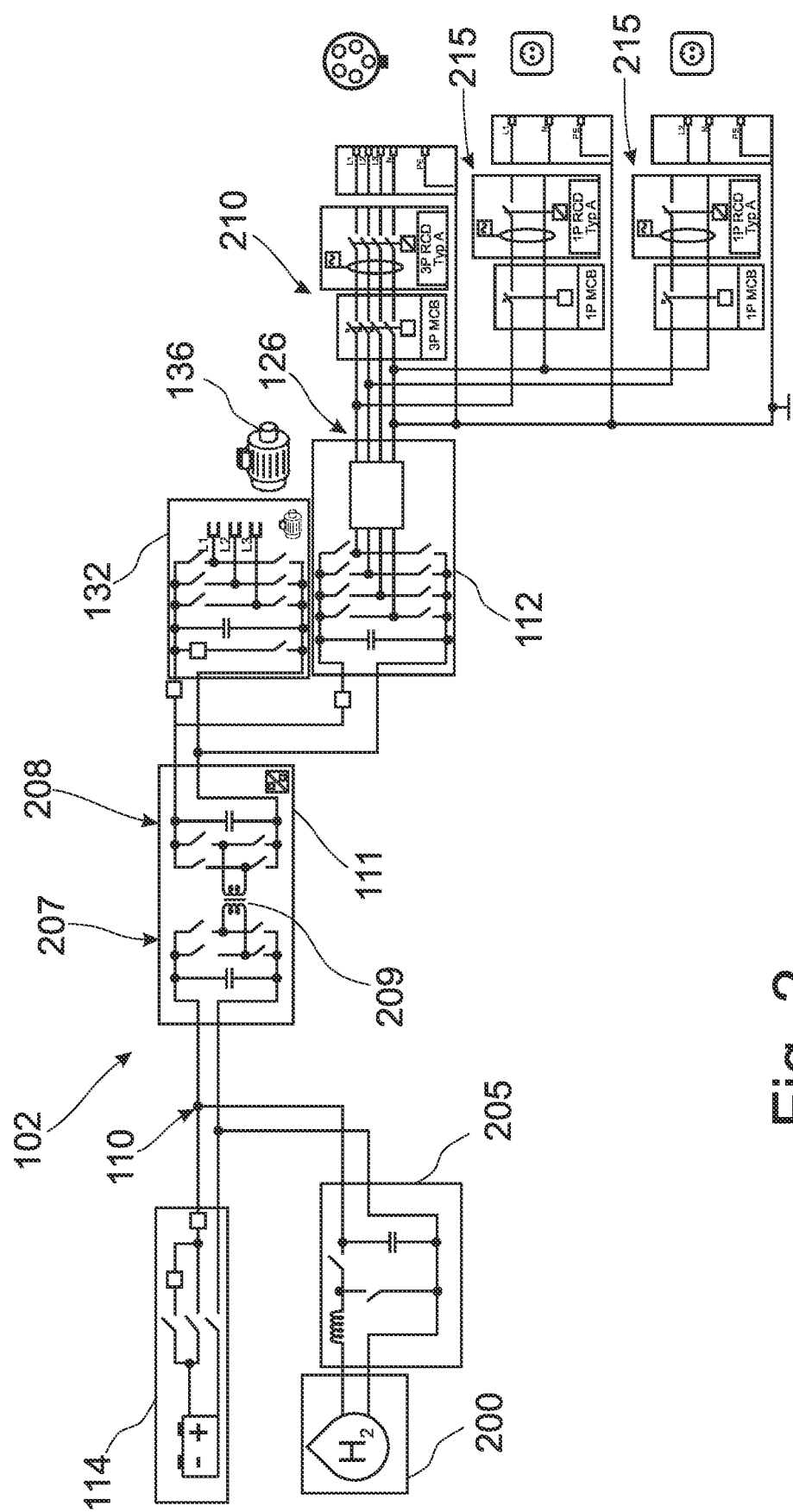
FIG. 2 is an apparatus.

FIG. 2 shows a schematic illustration of an apparatus 102 according to an exemplary embodiment. This may be the apparatus 102 described in FIG. 1.

According to this exemplary embodiment, furthermore a vehicle fuel cell 200 is electrically connected outside of the vehicle battery 114 to the energy supply interface 110. According to this exemplary embodiment, a step-up device 205 is contact-connected between the vehicle fuel cell 200 and the energy supply interface 110, the step-up device being designed to increase an energy supplied by the vehicle fuel cell 200. According to an exemplary embodiment, the vehicle fuel cell 200 and/or step-up device 205 are part of the apparatus 102.

The DC-DC converter 111 is designed to increase or decrease the DC voltage depending on a speed of a switching frequency of one or more DC-DC converter switches 207, 208 of the DC-DC converter 111. The conversion is carried out with the aid of the periodically operating DC-DC converter switch or switches 207, 208 and one or more energy stores, in this case in the form of capacitors. An inductance 209, as inductive converter, used to intermediately store the energy consists for example of a coil or a converter transformer. A known converter, which has an adjustable amplification factor, can thus be used as DC-DC converter 111.

According to this exemplary embodiment, the inverter 112 and/or further inverter 132 has at least one bridge circuit composed of switches, typically transistors. Recourse can be made to known inverters as inverters 112, 132.

According to this exemplary embodiment, three unit connections 210, 215 for each vehicle-internal or vehicle-external unit are electrically coupled to the energization interface 126. According to an exemplary embodiment, a first unit connection 210 is formed as a first plug, which is designed to supply within a tolerance range of 15% deviation 400 volts to 600 volts AC, for example within a tolerance range of 10% deviation in a frequency range of 50 hertz to 60 hertz, for a first unit. According to an exemplary embodiment, a second unit connection 215 is formed as a second plug, which is designed to supply within a tolerance range of 15% deviation 230 volts AC, for example within a tolerance range of 10% deviation in a frequency range of 50 hertz to 60 hertz, for a second unit. According to an exemplary embodiment, a further second unit connection 215 is formed as a further second plug, which is designed to supply within a tolerance range of 15% deviation 230 volts AC, example within a tolerance range of 10% deviation in a frequency range of 50 hertz to 60 hertz, for a second unit. According to an exemplary embodiment, the first unit connection 210, second unit connection 215 and/or further second unit connection 215 are part of the apparatus 102. According to an alternative exemplary embodiment, the apparatus 102 at the energization interface 126 has fewer than the unit connections 210, 215 shown in FIG. 2 or an arbitrary number of additional first unit connections 210 and/or additional second unit connections 215, which are formed for example in the form of plugs, as illustrated in FIG. 2.

According to an exemplary embodiment, the microgrid (400 VAC/50 Hz) represents an electricity grid with an AC voltage in the form of 3×0 . . . 230 V±15% or 3×0 . . . 400 V±15%, for example in a frequency range of 50 Hz±10% or 60 Hz±10%.

Figure 3:
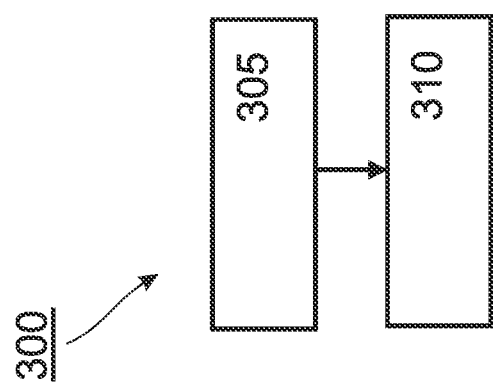
FIG. 3 is a flow chart of a method for operating an apparatus.

FIG. 3 shows a flow chart of a method 300 for operating an apparatus according to an exemplary embodiment. This may be the apparatus described in FIG. 1 or 2 in one of the presented variants.

The method 300 has an increasing step 305 and a conversion step 310. In the increasing step 305, an input voltage applied to the first connection is increased in response to the amplifier signal and an output voltage, which is increased with respect to the input voltage, is supplied at the second connection. In the conversion step 310, a DC voltage applied to the inverter connection is converted to an AC voltage and the AC voltage is supplied at the energization interface.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus for increasing an input voltage, comprising:
   an energy supply interface configured to connect the apparatus to a vehicle battery of an electric vehicle and/or to a vehicle fuel cell of the electric vehicle;
   a DC-DC converter having a first connection configured to connect the DC-DC converter to the energy supply interface and a second connection configured to connect the DC-DC converter to an inverter, wherein the DC-DC converter is designed to supply an output voltage at the second connection in response to an amplifier signal, the output voltage being increased with respect to the input voltage applied to the first connection;
   an inverter connection of the inverter configured to connect the inverter to the second connection; and
   at least one energization interface of the inverter configured to energize at least one unit coupled to the at least one energization interface,
   wherein the inverter is configured to convert a DC voltage applied at the inverter connection to an AC voltage and to supply same to the at least one energization interface,
   wherein the DC-DC converter supplies the output voltage at the second connection, the output voltage corresponding to the input voltage when the amplifier signal is not present,
   wherein the DC-DC converter has a third connection for connecting the DC-DC converter to a further inverter, wherein the DC-DC converter is designed to furthermore supply the output voltage at the third connection in response to the amplifier signal, the output voltage being increased with respect to the input voltage applied to the first connection.

2. The apparatus according to claim 1, in which the inverter supplies the AC voltage of essentially 400 to 600 volts or of 230 volts and/or in a frequency range of essentially 50 Hz to 60 Hz at the at least one energization interface.

3. The apparatus according to claim 1, having the further inverter, which has a fourth connection for connecting the further inverter to the third connection and a fifth connection for connecting the further inverter to an additional drive,
wherein the further inverter converts the DC voltage applied to the fourth connection to the AC voltage and to supply same at the fifth connection.

4. The apparatus according to claim 3, in which the further inverter is designed to supply the AC voltage of essentially 400 to 600 volts and/or in a frequency range of essentially 50 Hz to 60 Hz at the fifth connection.

5. The apparatus according to claim 4, wherein the additional drive has an additional drive connection for connection to the fifth connection.

6. The apparatus according to claim 1, further comprising:
a control device configured to output the amplifier signal to supply the output voltage at the second connection, the output voltage being increased with respect to the input voltage applied to the first connection.

7. The apparatus according to claim 6, wherein the control device is configured to output the amplifier signal when the input voltage has or falls below a defined minimum voltage limit value.

8. The apparatus according to claim 6, wherein the control device is configured to output the amplifier signal when the input voltage exceeds a defined minimum voltage limit value.

9. The apparatus according to claim 1, wherein the DC-DC converter is configured to supply the output voltage at the second connection in response to the amplifier signal, the output voltage having at least 576 volts.

10. The apparatus according to claim 1, wherein the vehicle battery and/or the vehicle fuel cell is designed to supply the DC voltage between 500 and 650 volts.

11. An electric vehicle having an apparatus for increasing an input voltage, comprising:
an energy supply interface configured to connect the apparatus to a vehicle battery of the electric vehicle and/or to a vehicle fuel cell of the electric vehicle;
a DC-DC converter having a first connection configured to connect the DC-DC converter to the energy supply interface and a second connection configured to connect the DC-DC converter to an inverter, wherein the DC-DC converter is designed to supply an output voltage at the second connection in response to an amplifier signal, the output voltage being increased with respect to the input voltage applied to the first connection;
an inverter connection of the inverter configured to connect the inverter to the second connection; and
at least one energization interface of the inverter configured to energize at least one unit coupled to the at least one energization interface,
wherein the inverter is configured to convert a DC voltage applied at the inverter connection to an AC voltage and to supply same to the at least one energization interface,
wherein the DC-DC converter supplies the output voltage at the second connection, the output voltage corresponding to the input voltage when the amplifier signal is not present, and
wherein the DC-DC converter has a third connection for connecting the DC-DC converter to a further inverter, wherein the DC-DC converter is designed to furthermore supply the output voltage at the third connection in response to the amplifier signal, the output voltage being increased with respect to the input voltage applied to the first connection.

12. A method for operating an apparatus, for increasing an input voltage, having an energy supply interface configured to connect the apparatus to a vehicle battery of an electric vehicle and/or to a vehicle fuel cell of the electric vehicle; a DC-DC converter having a first connection configured to connect the DC-DC converter to the energy supply interface and a second connection configured to connect the DC-DC converter to an inverter, wherein the DC-DC converter is designed to supply an output voltage at the second connection in response to an amplifier signal, the output voltage being increased with respect to the input voltage applied to the first connection; an inverter connection of the inverter configured to connect the inverter to the second connection; and at least one energization interface of the inverter configured to energize at least one unit coupled to the energization interface, wherein the inverter is configured to convert a DC voltage applied at the inverter connection to an AC voltage and to supply same to the at least one energization interface, comprising:
increasing the input voltage applied to the first connection in response to the amplifier signal and supplying the output voltage, which is increased with respect to the input voltage, at the second connection; and
converting the DC voltage applied to the inverter connection to the AC voltage and supplying the AC voltage at the at least one energization interface,
wherein the DC-DC converter supplies the output voltage at the second connection, the output voltage corresponding to the input voltage when the amplifier signal is not present, and
wherein the DC-DC converter has a third connection for connecting the DC-DC converter to a further inverter, wherein the DC-DC converter is designed to furthermore supply the output voltage at the third connection in response to the amplifier signal, the output voltage being increased with respect to the input voltage applied to the first connection.

* * * * *